US 7,290,154 B2

(12) United States Patent
Palem et al.

(10) Patent No.: US 7,290,154 B2
(45) Date of Patent: Oct. 30, 2007

(54) PROBABILISTIC AND INTROVERTED SWITCHING TO CONSERVE ENERGY IN A DIGITAL SYSTEM

(75) Inventors: Krishna V. Palem, Atlanta, GA (US); Suresh Cheemalavagu, Marietta, GA (US); Pinar Korkmaz, Istanbul (TR); Bilge E. Akgul, Istanbul (TR)

(73) Assignee: Georgia Tech Research Corporation, Atlanta, GA (US)

( * ) Notice: Subject to any disclaimer, the term of this patent is extended or adjusted under 35 U.S.C. 154(b) by 380 days.

(21) Appl. No.: 11/115,651

(22) Filed: Apr. 27, 2005

(65) Prior Publication Data

US 2005/0240787 A1    Oct. 27, 2005

Related U.S. Application Data

(60) Provisional application No. 60/565,748, filed on Apr. 27, 2004.

(51) Int. Cl.
*G06N 3/02* (2006.01)

(52) U.S. Cl. ............... 713/320; 713/300; 713/310; 713/321; 713/322; 713/323; 713/324; 713/330; 713/340; 706/14; 706/45; 706/52

(58) Field of Classification Search ............... 713/300, 713/310, 320–324, 330, 340; 706/14, 44, 706/52
See application file for complete search history.

(56) References Cited

U.S. PATENT DOCUMENTS

| | | | |
|---|---|---|---|
| 4,855,690 A | 8/1989 | Dias | 331/78 |
| 6,104,968 A * | 8/2000 | Ananth | 700/297 |
| 6,195,669 B1 | 2/2001 | Onodera et al. | 708/3 |
| 6,314,441 B1 * | 11/2001 | Raghunath | 708/322 |
| 6,463,422 B1 | 10/2002 | Hangartner | 706/14 |
| 6,469,576 B2 | 10/2002 | Hasegawa | 330/69 |
| 6,542,014 B1 | 4/2003 | Saito | 327/164 |
| 6,567,927 B1 * | 5/2003 | Brinkmann | 714/10 |
| 6,593,788 B1 | 7/2003 | Vogts | 327/164 |
| 6,618,711 B1 * | 9/2003 | Ananth | 706/14 |
| 7,085,749 B2 * | 8/2006 | Matsugu | 706/20 |
| 2004/0088272 A1 * | 5/2004 | Jojic et al. | 706/13 |

OTHER PUBLICATIONS

Palem, K., "Energy Aware Computing Through Probabilistic Switching: A study of Limits," *CASES '03*, Oct. 30-Nov. 2, 2003, 5 pages.

Hedge, R. and Shanbhag, N., "Toward Achieving Energy Efficiency in Presence of Deep Submicron Noise," *IEEE Transactions on Very Large Scale Integration (VLSI) Systems*, vol. 8, No. 4, Aug. 2000, pp. 379-391.

(Continued)

*Primary Examiner*—A. Elamin
(74) *Attorney, Agent, or Firm*—Thomas, Kayden, Horstemeyer & Risley, LLP

(57) ABSTRACT

A processor having binary switches is configured to operate at a predetermined probability value that the logical value of each switch is correct. A supply voltage is coupled to the binary switches. A randomized signal detector is configured to detect a randomized signal, which may be amplified to a predetermined level if the randomized signal is low. A computing element outputs a probabilistic binary bit having a 0 or 1 with a predetermined probability value of being correct in correspondence with the supply voltage and/or an amplification level of a noise signal. Subsequently, an application executed by the processor receives the probabilistic binary bit for one or more additional operations. By operating on the probabilistic binary bits instead of conventional deterministic bits, the processor consumes less energy and completes its execution faster. For battery-powered portable electronic devices, use of processor configured for probabilistic binary bits substantially lengthens battery life.

30 Claims, 10 Drawing Sheets

OTHER PUBLICATIONS

Asahi, N., Akazawa, M., and Amemiya Y., "Single-Electron Logic Device Based on the Binary Decision Diagram," *IEEE Transactions on Electron Devices*, vol. 44, No. 7, Jul. 1997, pp. 1109-1116.

Stein, K., "Noise-Induced Error Rate as Limiting Factor for Energy per Operation in Digital IC's," *IEEE Journal of Solid-State Circuits*, Co. SC-21, No. 5, Oct. 1977, pp. 527-530.

* cited by examiner

| in | f(in) |
|---|---|
| 0 | 0 |
| 1 | 1 |

Identity Function

| in | f(in) |
|---|---|
| 0 | 1 |
| 1 | 0 |

Complement Function

| in | f(in) |
|---|---|
| 0 | 0 |
| 1 | 0 |

Constant Function 0

| in | f(in) |
|---|---|
| 0 | 1 |
| 1 | 1 |

Constant Function 1

FIG. 8

PROBABILISTIC AND INTROVERTED SWITCHING TO CONSERVE ENERGY IN A DIGITAL SYSTEM

CROSS REFERENCE TO RELATED APPLICATION

This application claims priority to U.S. provisional application entitled, "Randomized Computing Elements And Their Applications," having Ser. No. 60/565,748, filed Apr. 27, 2004, which is entirely incorporated herein by reference.

STATEMENT REGARDING FEDERALLY SPONSORED RESEARCH OR DEVELOPMENT

This invention was made with Government support under contract number F30602-02-2-0124, awarded by the U.S. Air Force. The U.S. Government has certain rights in and to this invention.

TECHNICAL FIELD

The present disclosure pertains to computer processors, and more specifically, to a system and method for probabilistic determinations of binary switch states and introverted switching to reduce energy consumption and achieve accelerated execution times.

BACKGROUND

The use of portable electronic devices has exploded in recent years. As shown in FIG. 1, individuals today carry portable electronic devices such as wireless phones 18, PDAs, music players 20, laptop computers 12, and other similar devices. These devices may be battery powered, which means that each device may operate for a finite period of time before its respective battery is exhausted. Even with improved battery technologies, it is not uncommon for the battery life for such portable electronic devices to be anywhere from a few hours to a few days.

As a nonlimiting example, a person taking a cross-country flight from New York to Los Angeles desiring to utilize music player 20 for the long flight may need to recharge the player 20 before returning back to the East Coast on the return flight. Thus, the individual would need to pack the requisite accompanying equipment to recharge the player's battery prior to the return flight, in this nonlimiting example, as the music player 20 otherwise would not have the battery life to operate for both the outgoing and return flights. This is but one nonlimiting example, as one of ordinary skill in the art would readily know of other examples wherein the battery life of such portable electronic devices may lead to periodic recharging.

These portable electronics may include one or more processors, which may be configured to consume a significant amount of battery energy, thereby leading to a relatively short battery life. At least one reason that a processor may prematurely exhaust a battery may be related to the fact that processors of today are oftentimes configured to make certain that each data bit processed is either a 0 or 1 at each step of a calculation. In making attempts to ensure a particular value as being a 0 or a 1, a processor may consume a significant amount of energy by holding that particular state at the 0 or 1. Furthermore, a processor containing millions of switches may consume a significant amount of the battery's energy in ensuring the accuracy of each switch's change of state from either 1 to 0 or 0 to 1. So in ensuring the accuracy of each switch as it changes state, a typical processor may consume additional battery energy that may otherwise be used for extended processing time.

Moreover, one of ordinary skill would know that some quantifiable level of battery energy may be lost due to leakage currents in the processor's transistor switches. Leakage current refers to the amount of current that flows through the transistor switch when there is no switching action. So for the millions of transistors in a typical processor chip, the aggregated leakage may significantly reduce battery life.

FIG. 1, as referenced above, is a diagram of a nonlimiting exemplary group of devices that may operate on battery power and/or may otherwise be configured for power conservation operations. In this nonlimiting example of FIG. 1, processor chip 10 may be included in each of laptop 12, videocamera 14, television 16, wireless telephone 18, and music player 20. These devices shown in FIG. 1 are but nonlimiting examples, as one of ordinary skill in the art would know of additional nonlimiting examples which may also have a processor similar to processor 10 of FIG. 1. Nevertheless, in this nonlimiting example, exploded window 24 depicts four transistor switches 26-29 of a potentially much larger number, which may be contained in processor 10. Stated another way, transistor switches 26-29 may comprise four of the millions of transistor switches resident in the processor 10 chip.

As the transistor switches 26-29 switch states from 0 to 1 and/or 1 to 0, the battery resident in each of the portable devices of FIG. 1 may be more quickly drained if processor 10 is configured so as to calculate with a greater degree of certainty for each transistor to change its status from a 0 to 1 or a 1 to 0. Moreover, as stated above, the leakage current for each transistor 26-29, as well as the rest of the millions of transistors on processor 10, may be aggregated to a significant amount such that the battery in each of devices 12, 14, 16, 18 and 20 of FIG. 1 may be caused to expire more quickly.

Furthermore, in compliance with Moore's Law, which states that silicon power doubles approximately every 18 months to 2 years, the number of transistors resident on processor 10 will likely increase over time as the size of the transistors decreases. As a nonlimiting example, if semiconductor engineers reduce the size of transistors by only approximately 10% a year, a twofold increase in the number of transistors on a chip will likely be realized every 18 months to 2 years.

Even on processor 10, transistors on the chip are not necessarily identical to each other. As transistors become smaller and smaller, variability between transistors steadily increases. As the various transistors on processor 10 may look different electrically, the result may be realized in haphazard variations in performance of processor 10. As a result, processor 10 may actually become more unreliable as an increasing amount of transistors are included in processor 10, thereby resulting in an untrustworthy quotient in each of laptop 10, camera 14, television 16, wireless phone 18, and music player 20, all of FIG. 1.

The amount of heat generated by a processor is a limitation for processors configured with a large number of transistors, as well as processors configured for high speed operation and calculations. Thus, to avoid melting the copper circuit lines within the processor 10, such chips may be fitted with speed limiters. Speed limiters may be configured to prevent a processor 10 chip from calculating numbers as fast as it otherwise may. Nevertheless, the heat generated in processor 10 may be be attributed to the deterministic design of the chip itself, that is, to ensure data bits at 1s or 0s.

Prior attempts have been made to conserve battery life and also to reduce the heat generated by processor 10; however, results have been mixed. In one nonlimiting example, chip designers have created schemes that activate certain blocks of transistors used for particular calculations and deactivate the remaining blocks of transistors of the processor 10 so as to conserve battery energy and to reduce heat from a lesser number of transistors that are actually used. Here, the activation of blocks of transistors refers to triggering these blocks of transistors for receipt and evaluation of their inputs in order to produce the corresponding new output data. Whereas, the deactivation of blocks of transistors refers to preventing these blocks of transistors from receiving and hence evaluating their inputs. Therefore, once the blocks of transistors are deactivated, they do not perform any switching action and hence, hold their previous states.

While this solution is an improvement over prior designs which simply activate all transistors of a processor 10, thereby consuming a greater amount of energy of a device's battery, this solution still fails to adequately preserve a battery. In this instance, a substantial number of transistors even in the blocks that are activated are still unused, thereby essentially wasting valuable battery energy. Plus, this solution does not account for the energy consumed due to the deterministic approach to ensure the accuracy of each calculation as being either a 1 or a 0. Even activating select blocks of transistors on processor 10 still results in wasted battery energy and reduced battery life.

Moreover, due to decreased feature sizes, dopant fluctuations, thermal noise, increased sensitivity to $V_T$, capacitive/inductive noise, interconnect variations, crosstalk, power grid noise, tunneling noise, inter-/intra-die process variations as well as defects, etc.; the devices at nano-scale can easily become destabilized, and hence, showing randomized behaviors. To overcome noise effects and some of the aforementioned imperfections, energy consumption has been traded in for noise tolerance via increasing the operating supply voltage, which in turn increases the energy consumption. However, energy consumption, and associated thermal/heat dissipation are already major problems that are increasing with technology scaling. Therefore, it is difficult to fulfill low-power requirements while preserving a robust device operation. Stated another way, meeting low-power requirements increases the likelihood of unreliable device operations.

Such unreliable devices are likely to be more susceptible to noise, heat, defects, etc., which means that they may most likely be probabilistic—rather than deterministic—in nature. As the probabilistic behavior becomes the inevitable feature of these devices, processors will have to be made up of these unreliable devices while still operating at a desired performance level.

As a result, a heretofore unaddressed need exists to overcome the deficiencies and shortcomings described above.

DESCRIPTION OF THE DRAWINGS

Many aspects of this disclosure can be better understood with reference to the following drawings. The components in the drawings are not necessarily to scale, emphasis instead being placed upon clearly illustrating the principals of the present disclosure. Moreover, in the drawings, like reference numerals designate corresponding parts throughout the several views.

FIG. 8 is a table diagram of the possible functions of the switch of FIG. 7.

DETAILED DESCRIPTION

In addition to the drawings discussed above, this description describes one or more embodiments as illustrated in the above-referenced drawings. However, there is no intent to limit this disclosure to a single embodiment or embodiments that are disclosed herein. On the contrary, the intent is to cover all alternatives, modifications, and equivalents included within the spirit and scope of this disclosure and as defined by the appended claims.

Figure 1:
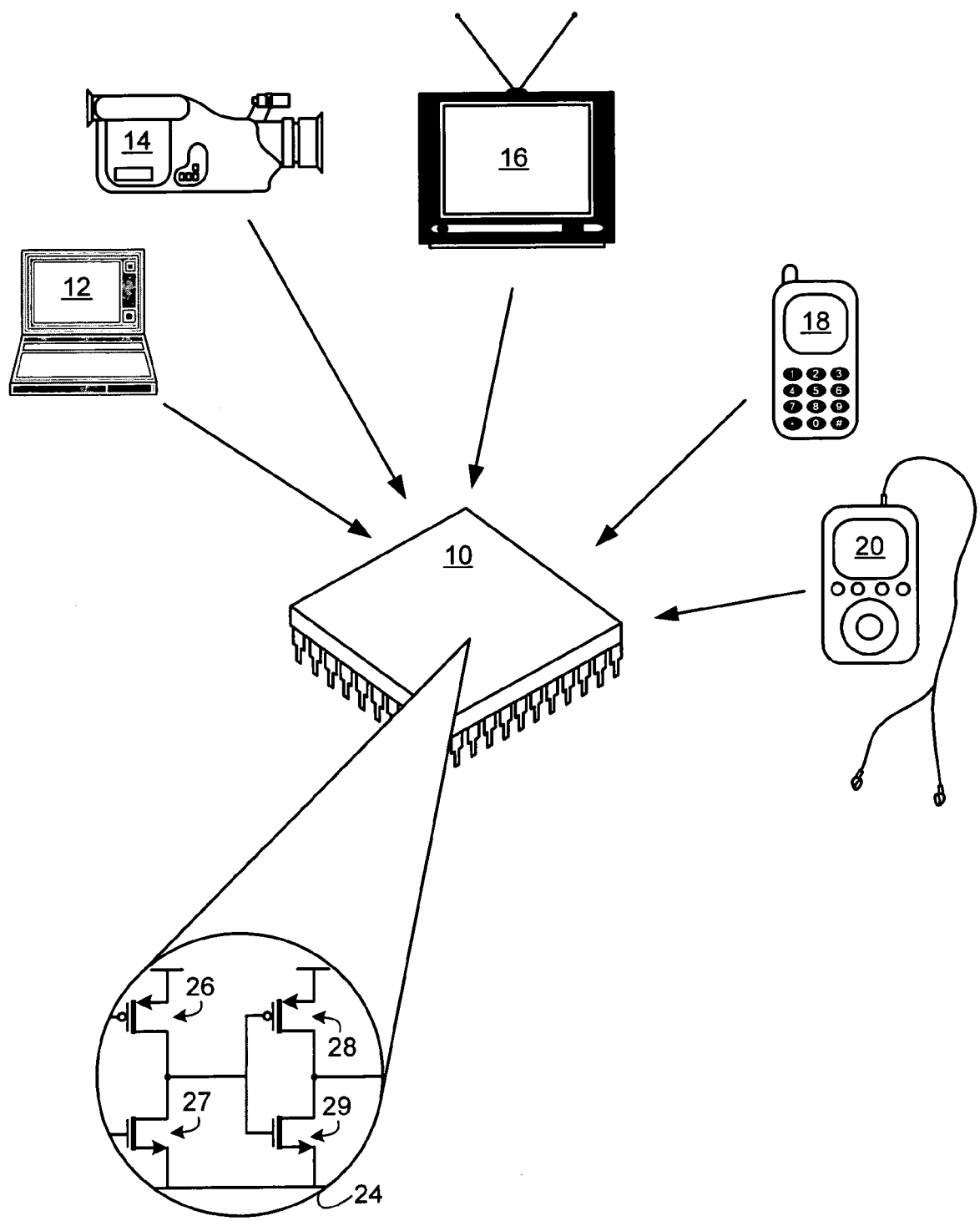
FIG. 1 is a diagram depicting various portable electronic devices that have an embedded processor.

As described above, today's processors consume a significant amount of energy for deterministic calculations. As described above, deterministic calculations pertain to ensuring that each data bit is either a 1 or 0 at every step of a calculation. However, if an application does not need such certainty, it is possible that energy consumption may be significantly reduced. Moreover, in this instance, the running time of a particular application may actually be decreased, and hence, its performance increased. As further described above, with the decreasing size of transistors on processor chips, such as processor 10 of FIG. 1, and the increasing variability between the various transistors on the chip, the predictability of such transistors may likewise be considered to be decreasing. Nevertheless, processors may be configured in hardware to utilize the unpredictable nature of such transistors while still performing the intended calculations of an application.

Instead of ensuring with a high degree of certainty the data bits as being a 1 or a 0, an approach may be made for the validation of probabilistic bits instead of the conventional bits described above. A probabilistic bit, or PBIT, is similar to a conventional bit as described above, in that it takes on a 0 or 1 value. However, the certainty of the PBIT may be expressed with the probability of p. In using PBITs instead of conventional bits, a particular computing element may calculate a value with less energy, thereby extending the life of a battery or other power source for the processor. Depending upon the desired probability p for a given calculation, a corresponding amount of energy may be associated with producing that probabilistic bit PBIT. For applications that may be suited for lower probability p values, a lesser amount of energy may be utilized such that battery consumption may be extended 10 to 100 or to even 1000 fold from current lifecycles.

Probabilistic computing has been previously utilized in software. However, as computer technology reaches physical limits, physical considerations accordingly become an increased concern. By applying probabilistic algorithms previously utilized in software applications to the hardware side of an embedded processor with reliable probability values, the result may be reduced power consumption, as well as decreased running-time of the computations. Moreover, by identifying the specific transistors needed for certain operations, processor 10 may be configured to turn off individual transistors of the hundreds of millions of transistors on the processor 10 chip bed so as to further conserve battery energy. The result in each of these operations is a lower amount of dissipated heat as well as a faster operating processor, while obtaining desired quality of execution of a particular application.

Randomization is a mathematical technique that enables design of algorithms wherein at each step, a random event influences the next step to be executed. Randomized algorithms do not always execute predictably, as opposed to deterministic algorithms, which may be utilized in the processor as described above. The transistor switches of a processor may operate as randomized devices in that they may be on or off with the interpretation that if the switch is on, its value is 1, whereas if it is off, its value is 0, or vice versa. As described above, the switching of these randomized devices (the transistors of a processor) utilize a measurable quantity of energy, which may be otherwise supplied by a battery of one or more of the portable electronic devices in FIG. 1.

The on and off states may be detected by observing the status change, which may be accomplished by measuring the voltage or current. The outcome of an energy expending action to turn the switch on or off is randomized in that it will occur with a fixed a priori probability p. The resulting output state of an on or off occurring with a probability p may be sustained with the same probability for the time it is switched, as a conventional switch. Consequently, the disclosure herein provides a system and method using randomness in such devices to achieve meaningful computation as well as to achieve performance in terms of faster execution times and reduced energy consumption.

More specifically, this disclosure describes a processor having one or more binary switches (i.e., transistors) configured to operate at a predetermined probability p that the logical value of each switch is correct. A supply voltage is coupled to the binary switches. A randomized signal detector is configured to detect a randomized signal, which may be amplified to a predetermined level if the randomized signal is low. A computing element outputs a probabilistic binary bit having a 0 or 1 with a predetermined probability value of being correct in correspondence with the supply voltage. Subsequently, an application executed by the processor receives the probabilistic binary bit for one or more additional operations. By operating on the probabilistic binary bit instead of a conventional bit as described herein, the processor consumes less energy and completes the execution of a particular application faster. For battery-powered portable electronic devices, use of processor configured for probabilistic binary bits substantially lengthens battery life.

Figure 2:
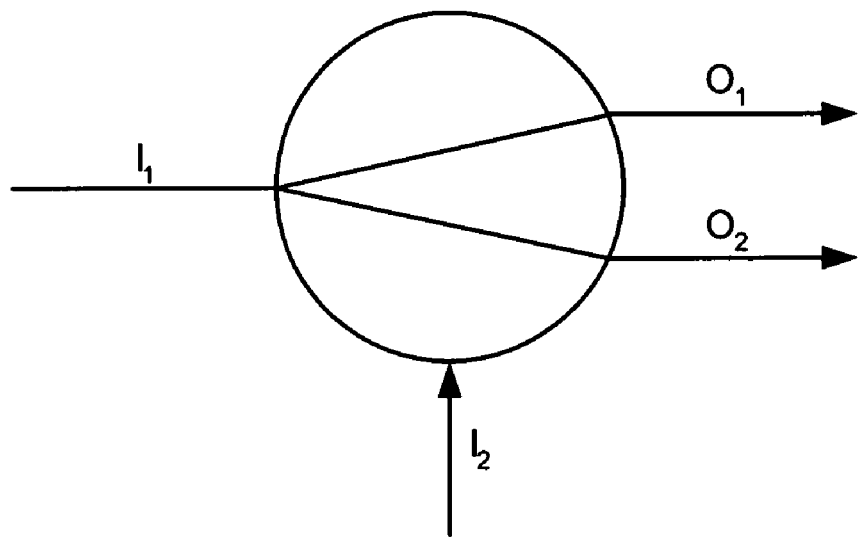
FIG. 2 is a diagram of a computing element (CE), as may be utilized by the processor of claim 1.

FIG. 2 is a diagram of a computing element (CE). The CE is an element that maps n inputs to m outputs where both n and m are greater than or equal to 1. In this nonlimiting example of FIG. 2, the output $O_1$ will be equal to $I_1$ if $I_2$=0. Likewise, output $O_2$ will be equal to $I_1$ if $I_2$=1. The CE of FIG. 2 may be a random computing element (RCE) if its outputs take on the value of 1 or 0 at random with a probability p, such that 0.5<p<1.

Figure 3:
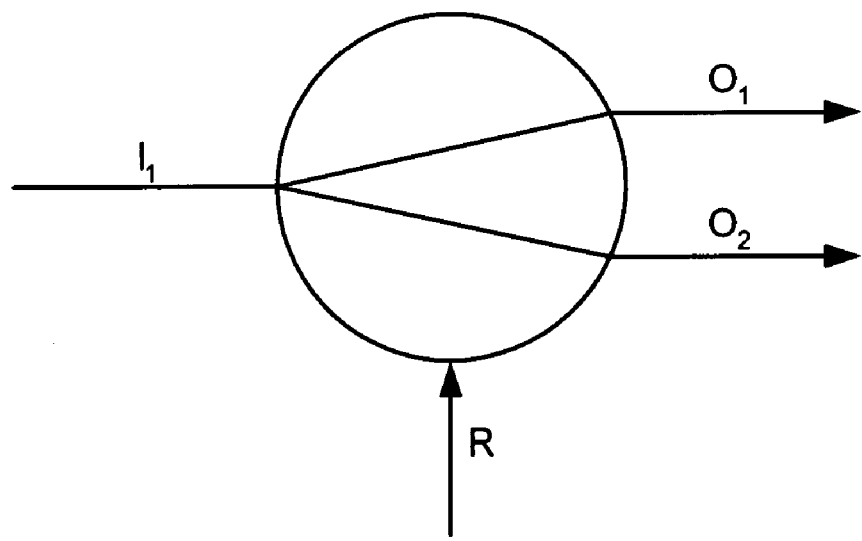
FIG. 3 is a diagram of a random computing element (RCE) based in part on the CE of FIG. 2, but with $I_2$ replaced with input R.

FIG. 3 is a diagram of the CE of FIG. 2, wherein $I_2$ of FIG. 2 is replaced with input R. In this nonlimiting example, input R will take the value 0 with a probability p and will take the value of 1 with the probability 1−p. Consequently, the output $O_1$ will be equal to $I_1$ with the probability of p, and $O_2$ will be equal to $I_1$ with the probability 1−p.

The element of FIG. 3 may actually be referred to as an RCE. If the randomness utilized by the RCE of FIG. 3 is obtained through the application of externally generated random bits to the RCE via its inputs or outputs, this result causes the RCE to be further characterized as an explicit RCE. An explicit RCE may generally include: (a) a dedicated component that generates the random output data bits; and (b) a dedicated component to which a random input is applied and which, in turn, produces the random output data bits. A nonlimiting example for an explicit RCE is a pseudo random number generator, as one of ordinary skill in the art would know.

Figure 4:
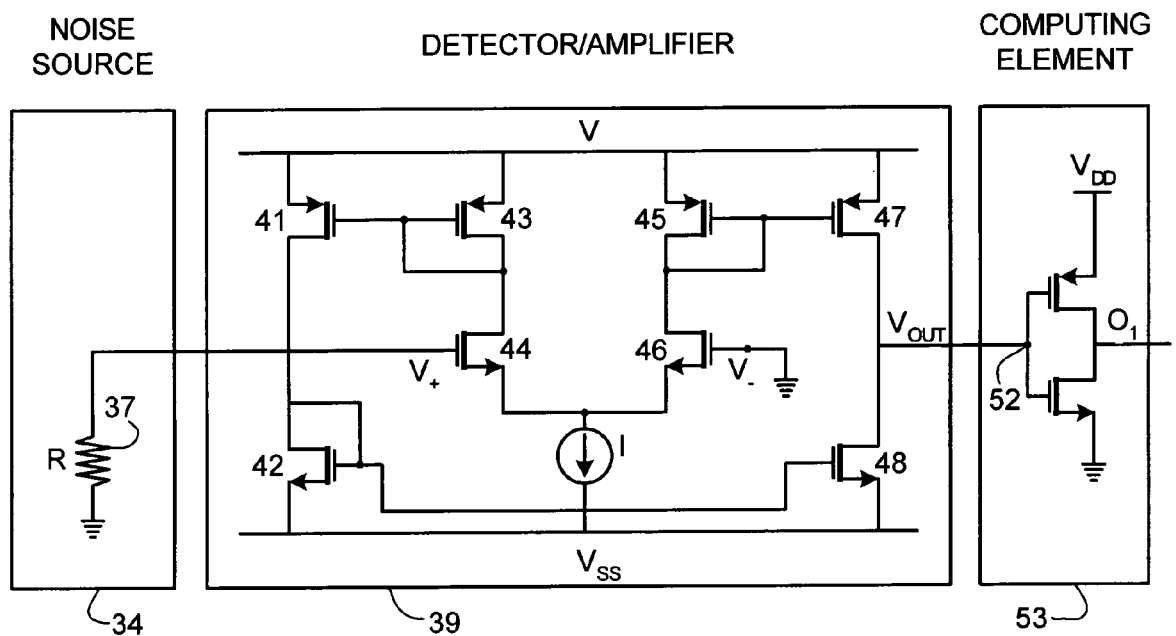
FIG. 4 is a nonlimiting exemplary diagram of an implicit RCE, as may be implemented in the processor of FIG. 1.

However, if the randomness of an RCE is not externally generated, but is obtained through the utilization of the inherent randomness in the computing element, then this RCE may be characterized as an implicit RCE. FIG. 4 is a nonlimiting exemplary diagram of an implicit RCE 31.

The implicit RCE 31 of FIG. 4 is comprised of three portions. The first portion 34 relates to the generation of a random signal. In this nonlimiting example, resistor 37 is used as a device that interprets randomization physically. The random source, in this nonlimiting example, may be thermal noise in the resistor. One of ordinary skill in the art would know, however, that utilizing thermal noise as the noise source is but one of many possible nonlimiting examples. As an additional nonlimiting example, the circuit configuration of FIG. 4 may be configured to detect power supply noise, tunneling noise, interconnect noise, crosstalk noises, and other deep sub-micron noise sources.

In the nonlimiting example of FIG. 4, the thermal noise signal across resistor 37 is a Gaussian noise signal, and the mean square value of the thermal noise voltage across resistor 37 may be represented by $$\overline{v_n^2} = \frac{4hfR\Delta f}{\exp(hf/kT) - 1}, \text{ where}$$

k is Boltzmann constant,
T is the absolute temperature,
R is the resistance,
h is Planck's constant, and
$\Delta f$ is the frequency bandwidth over which noise is measured.

Where f is <<kT/h, the equation above may be approximated as $$\overline{v_n^2} = 4kTR\Delta f.$$

Likewise, the mean square value of the thermal noise current may be represented as $$\overline{i_n^2} = (4kT/R)\Delta f.$$

As a nonlimiting example, the rms noise voltage of a resistor having a resistance of 100 kΩ at room temperature and a frequency range of 1 MHz is 40.216 μV with an rms noise current of 0.402 nA. Thus, this nonlimiting example depicts a noise signal that is small and potentially undetectable by a computing element. Accordingly, detector/amplifier 39 may be coupled to resistor 37 and is on the second portion.

Detector/amplifier 39 detects the small noise signal, as illustrated above, and, as a nonlimiting example, may be configured as a differential amplifier that operates in the sub-threshold region. The detector/amplifier 39 may be configured with transistors 41-48 coupled as shown having a differential stage that operates as a gain stage and a push-pull output stage. In this nonlimiting example, the sub-threshold region of operation may be utilized to maintain a low power consumption for the detector/amplifier 39 as desirable. In sub-threshold operation of a MOS transistor, the amount of inversion layer charge on the transistor surface is lower than a threshold value. Due to this small inversion charge, the resulting drain current may also be small. Smaller drain current results in lower power dissipation, as the current that will be charging and discharging capacitors will also be small.

The output of detector/amplifier 39 is coupled to the input of the computing element 53, the third portion of implicit RCE 31. Computing element 53 is comprised of one input and one output $O_1$; therefore, the output of detector/amplifier 39 will follow the input of the computing element 53. More specifically, $O_1$ may be represented to be equal to the inverse of the input of the computing element 53. Thus, $O_1$ takes on a value of 0 or 1 at random due to the fact that the input of the computing element 53 is a randomly generated signal, as described above.

The probability that the value 0 or 1 is correct for the implicit RCE 31 of FIG. 4 may be calculated according to the following equation:

$$p = \frac{1}{2} + \frac{1}{4}\text{erf}\left(\frac{V_m}{\sqrt{2}\,\sigma}\right) - \frac{1}{4}\text{erf}\left(\frac{V_m - V_{dd}}{\sqrt{2}\,\sigma}\right),$$

where $V_m$ is the switching point of the inverter defined as the point at which the input voltage of the inverter is the same as the output voltage of the inverter. In this nonlimiting example, $V_m$ may be represented as $$V_m = \frac{V_{dd} - |V_{Tp}| + \sqrt{\frac{\mu_n}{\mu_p} \cdot \frac{(W/L)_n}{(W/L)_p}} \cdot V_{Tn}}{1 + \sqrt{\frac{\mu_n}{\mu_p} \cdot \frac{(W/L)_n}{(W/L)_p}}},$$

where $V_{dd}$ is the supply voltage of the inverter. $V_{Tp}$ and $V_{Tn}$ are the threshold voltages of the PMOS and NMOS transistors of computing element 53. Also, $\mu_n$ and $\mu_p$ are the average mobility of electrons and holes for the NMOS and PMOS transistors of the computing element 53, respectively. The $(W/L)_n/(W/L)_p$ is the ratio of the aspect ratio of the NMOS transistor to the aspect ratio of the PMOS transistor.

Referring to the probability determination above, σ is the standard deviation of the Gaussian noise signal (i.e., σ is the rms value of the Gaussian noise signal), and erf is the well-known error function, which may be represented as $$\text{erf}(x) = \frac{2}{\sqrt{\pi}} \int_0^x e^{-u^2}\, du.$$

For this implicit RCE implementation, as shown in FIG. 4, it is evident from the equations above that p is related to the supply voltage ($V_{dd}$) and the standard deviation (σ) of the noise. Thus, p may be varied through changing $V_{dd}$ or σ. As a nonlimiting example, if $V_m = V_{dd}/2$, with $V_{dd}$=5 V, and σ=0.36 V, p for a data bit may be calculated to be 0.999999999999810. If $V_{dd}$=0.5V, probability p for the data bit may be calculated to be 0.75629823516199. Depending on the needs of the application, $V_{dd}$ can be set accordingly.

Figure 5:
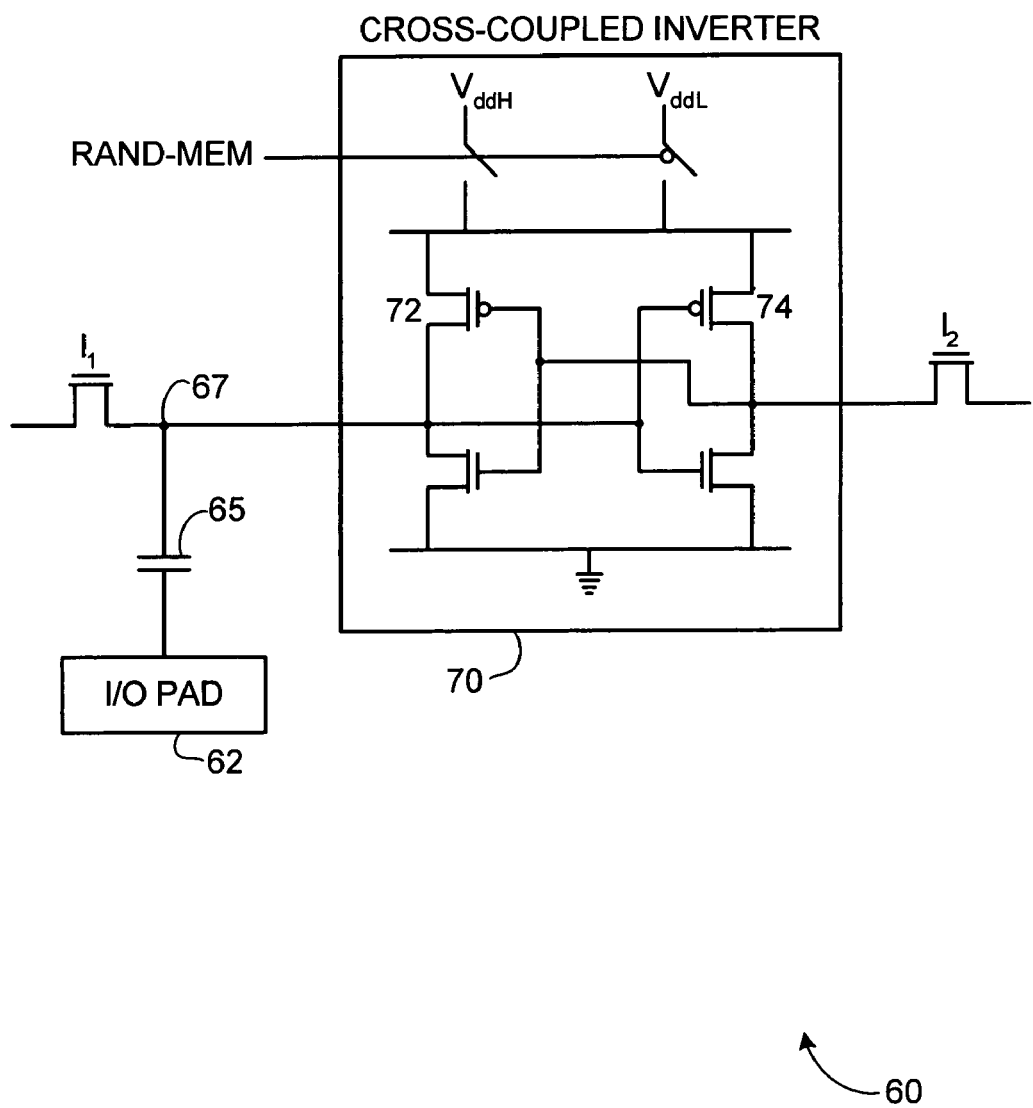
FIG. 5 is a diagram of an alternative embodiment of the implicit RCE of FIG. 4, as may also be implemented in the processor of FIG. 1.

FIG. 5 is a diagram of an alternative embodiment of the implicit RCE 31 of FIG. 4. In this implementation of FIG. 5, RCE 60 is configured as a 6-transistor SRAM cell, which may be a part of a VLSI chip, as one of ordinary skill in the art would know. The source of randomness is the noise caused by I/O signaling. The noise on I/O pad 62 is coupled via capacitor 65 to one of the input points 67 of cross-coupled inverter 70. One of ordinary skill in the art would know, additionally, that the Gaussian assumption on noise distribution may also be realized for I/O signaling. Thus, in this nonlimiting example of FIG. 5, Gaussian distribution for noise caused by I/O signaling is assumed.

At any point in time, cross-coupled inverter 70 may be connected to either one of the supply voltages ($V_{ddH}$ or $V_{ddL}$) depending upon the value of the one-bit rand-mem signal. When rand-mem is equal to 1, cross-coupled inverter 70 is connected to $V_{ddH}$. Otherwise, cross-coupled inverter 70 is connected to $V_{ddL}$ when the rand-mem signal is equal to 0.

In this implicit RCE 60 implementation, it may be assumed that $V_{ddH}$ is greater than 10 times the standard deviation of the noise on I/O pad 62. Since the noise is affecting one of the inverters 72, 74 in cross-coupled inverter 70, the probability equation set forth above may still be utilized for this implicit RCE 60 implementation. Consequently, probability p of this implementation 60 may be manipulated by changing the supply voltage, the standard deviation of noise, or both. Based on the probability equation set forth above, the probability p of PBIT being correct is at least 0.99999971334843 if $V_{ddH}$ is greater than 10 times the standard deviation of the noise at I/O pad 62.

It is assumed that $V_{ddL}$ is no more than twice the standard deviation, which means that the probability p is at most 0.84134474606854. Consequently, when $V_{ddH}$ is connected to cross-coupled inverter 70, the result corresponds to highly reliable operation. Conversely, the presence of $V_{ddL}$ connected to cross-coupled inverter 70 results in unreliable operation, which may further be characterized as randomized operation. However, a particular application with probabilistic-based computations may be executed with a lower probability level while conserving battery life and/or generating less heat in the processor.

The use of this dual supply voltage scheme may be explained in the context of the randomized algorithms. In some of the randomized algorithms such as random routing, genetic algorithms, simulated annealing, and random sorting, random numbers that are generated are typically stored, as further use of the random numbers is needed. Yet, it may not be necessary to generate a random bit and then write it into a memory cell, such as the 6-transistor SRAM cell in FIG. 5. The reason the random bit may not be written to memory results from the fact that the first read from a random memory element may also serve the purpose of generating the random bit. When cross-coupled inverter 70 is coupled to $V_{ddL}$, which means that the random memory signal is equal to 0, there is a random value stored in the memory cell. The I/O signaling fluctuations of the output of inverter 72 causes the storage of a random value in the memory cell. If the random memory signal is set to 1 before a read access to this memory, the random bit will be read (generated). As long as the rand-mem signal is 1, the random bit will be reliably stored in the memory cell. Hence, the generation and storage of a random bit can be realized through the first read from the random memory element by means of the dual supply voltage scheme.

Figure 6:
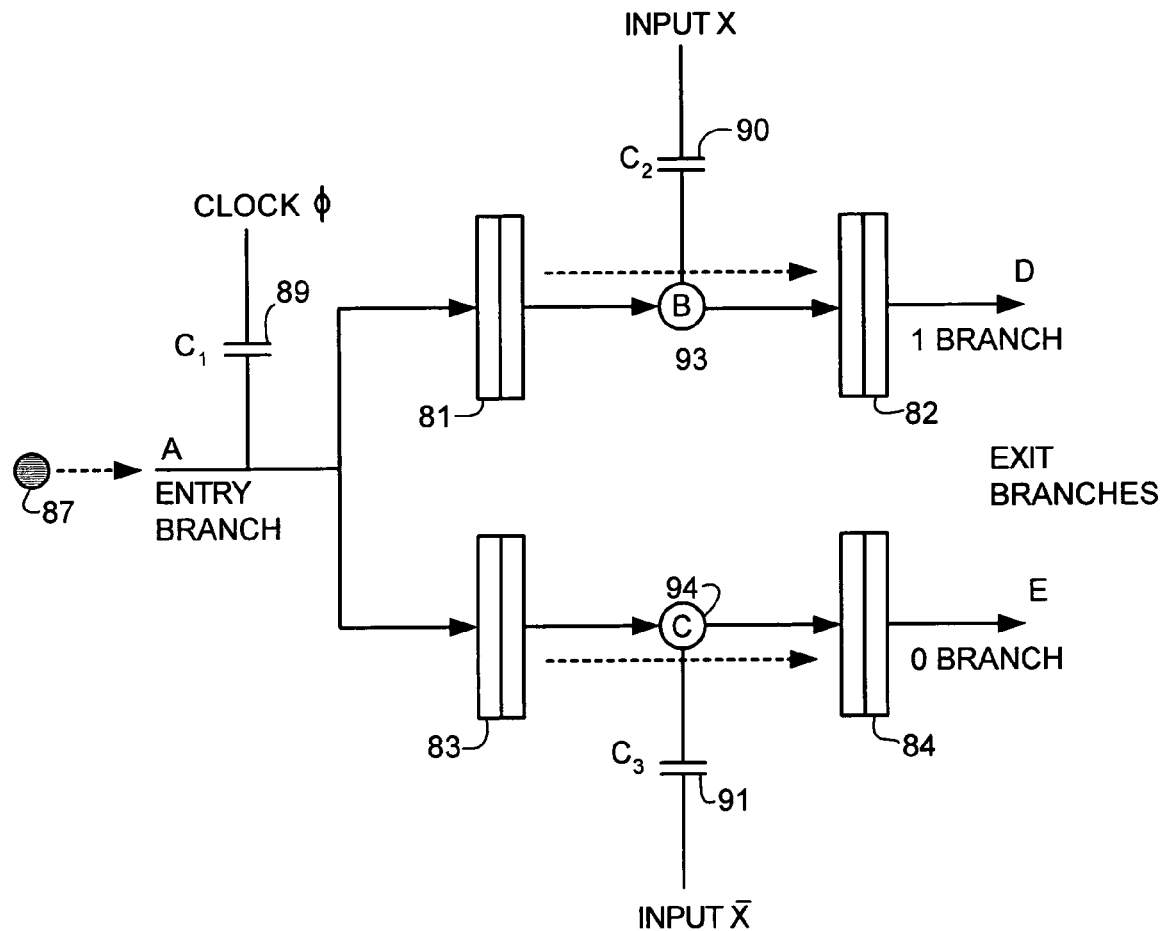
FIG. 6 is an alternative embodiment of an implicit RCE, as may be implemented in the processor of FIG. 1.

FIG. 6 is an alternative embodiment of an implicit RCE 78. In this nonlimiting example, the implicit RCE 78 comprises a plurality of single electron transistors (SETs) 81-84. The implicit RCE 78 of FIG. 6 is a single-electron switch with differential inputs. In this switch 78, there are four tunnel junctions 81-84 and three capacitances 89-91.

The input voltage X may be applied through capacitor 90, while a complement of X may be applied through capacitor 91. If the input voltage X is an appropriate positive voltage, then the input value may be interpreted as a binary 1 in the 1 branch. However, if X is a proper negative voltage, then the input value may be a binary 0 on the 0 branch.

Tunneling through junctions 81 and 83 is controlled by the charge on capacitors 89-91, the values of X and $\overline{X}$, and the value of the clock voltage φ. As a nonlimiting example, electron 87 may tunnel through single electronic junction 81 toward island 93 if the charge on the right side of single electronic junction 81 is more positive than a charge on the left side of single electronic junction 81, wherein the charge on the right side is dependent upon the capacitance of capacitor 90, the value of the input voltage X, and the value of the clock voltage φ. Similarly, the charge on the left side of single electron junction 81 is dependent upon the capacitance of capacitor 90, the value of the complementary input voltage $\overline{X}$, and the value of clock voltage φ. When an electron is supplied at the entry branch, it follows the path A→B→D (the 1 branch) if X has a positive value. Likewise, an electron follows the path of A→C→E (the 0 branch) if X has a negative value. Thus, if an electron follows the A→B→D path, it may be interpreted as switching to 1. If an electron 87 follows the path A→C→E, it may be interpreted as switching to 0.

Tunneling is a probabilistic phenomenon, and the waiting time for the expected tunneling is not fixed. For the device operation without error, the clock duration should be sufficiently long. The probability of that the waiting time for the expected tunneling will be longer than the clock period ($t_{CLK}$) is given by $$p_e = \exp(-t_{CLK}\Gamma_1),$$

where $\Gamma_1$ is the mean tunneling rate. The probability for incorrect operation may be represented as $p_e$, whereas the probability for correct operation in the implementation of this implicit RCE 78 of FIG. 6 may be represented as $p=1-p_e$. Thus, this equation above depicts that the probability p may be varied by changing the clock period $t_{CLK}$.

The implicit computing elements described above generate probabilistic bits such that applications or algorithms may exploit the probabilistic nature of these bits to execute probabilistic computations faster and with less energy. Stated another way, using one or more of the circuit implementations described above (which one of ordinary skill in the art would know could be implemented across an entire processor core), enables an application running on such processor to still be able to properly execute with an increased but tolerable amount of error. As a nonlimiting example, applications configured for such processors may be configured to tolerate error up to approximately 25%, which may equate to a significant power reduction in the processor. As a nonlimiting example, if the power reduction was on the order of 10, a normal battery cycle of 20 hours may be extended to a period of 200 hours. In application, energy improvements may be realized by a factor of 30 or 40 and perhaps other applications by even a factor of 1000, depending upon the desired operational quality for the application.

As a nonlimiting example, a soldier on a battlefield equipped with a battery-powered electronic device may be able to switch processor 10 to do probabilistic computations so as to conserve battery power but while still obtaining the desired substantive battlefield information. As a nonlimiting example, a soldier's display, which may otherwise provide topology and other data, may be configured to show more simplistic drawings in the probabilistic computation mode, as described above, but still the data desired by the soldier. As an additional nonlimiting example, the soldier may switch the processor into even a further power reduction mode such that even less auxiliary data is provided so that the processor may use probabilistic computations to still provide the substantive battlefield data the soldier desires. In this nonlimiting example, the battery-powered electronic device utilized by the soldier may be extended while the soldier is deployed in the battlefield, unable to otherwise charge or replace the battery. So, by configuring the processor for probabilistic calculations rather than ensuring absolute accuracy of data bits, the soldier may remain on the battlefield longer with valuable battlefield information.

The nonlimiting implementation examples for implicit RCEs above can be viewed as building blocks or switches used to build more complicated processors that are composed of switches. These processors are built out of millions of switches that can be on or off. In the ideal case, these switches should be enabled when needed and should be disabled otherwise. A processor can be configured to turn off portions of the chip in order to conserve battery energy and/or reduce heat generated by the enabled but idle switches. Instead of just deactivating blocks of switches, which leaves other blocks on, but still having idle switches, the processor may be configured to activate or deactivate individual switches. This provides an improved resolution in deactivating idle or unneeded switches, which would otherwise waste battery energy.

Yet to accomplish this operation, the gate, or switch, has to be configured for such operation. In this instance, the switch may be configured to have an introverted sleep state, which may be activated on command. The switch may be activated, or awaken, on command when needed for operation.

Figure 7:
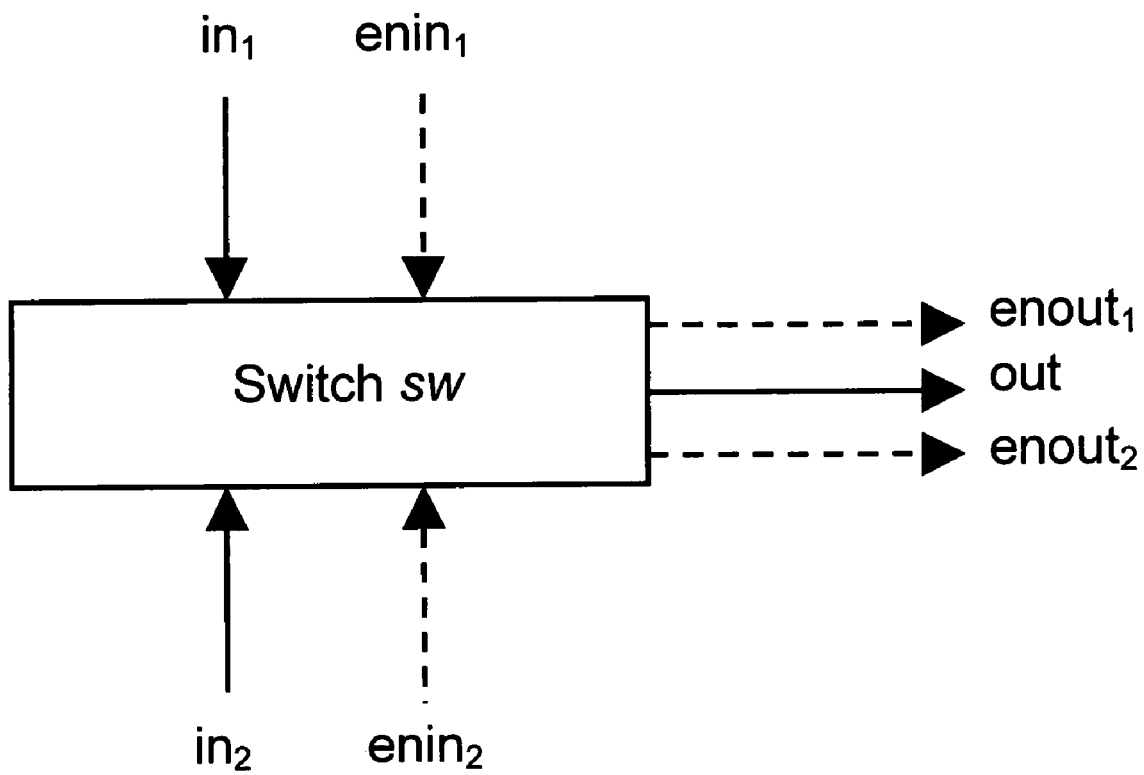
FIG. 7 is a diagram of an introverted switch, which may be included in the processor of FIG. 1.

FIG. 7 is a diagram of an introverted switch 80. As shown in FIG. 7, the switch 80 has four inputs: primary inputs ($in_1$ and $in_2$) and the associated enable inputs ($enin_1$ and $enin_2$). The enable input $enin_1$ is associated with input $in_1$ and the enable input $enin_2$ is associated with input $in_2$. The switch also has one primary output (out) and two enable outputs ($enout_1$ and $enout_2$).

For a correct operation of the switch, either enable signal $enin_1$ or enable signal $enin_2$, but not both, is asserted. If $enin_1$ is asserted ($enin_1=1$ and $enin_2=0$), then out will be a function, $f$, of the input $in_1$. If $enin_2$ is asserted ($enin_1=0$ and $enin_2=1$), then out will be a function, $f$ of the input $in_2$.

The function $f$ can be one of the four possible functions shown in FIG. 8, which is a table diagram of the possible functions. Specifically, the possible functions include: identity, complement, constant function 0 and constant function 1.

For a fixed function $f$ the introverted switch behaves as follows:
if $enin_1=1$ and $enin_2=0$, then
   $out=f(in_1)$
   $enout_1=out$
   $enout_2=\overline{out}$
else if $enin_1=0$ and $enin_2=1$, then
   $out=f(in_2)$
   $enout_1=out$
   $enout_2=\overline{out}$
else if $enin_1=0$ and $enin_2=0$, then
   $out=0$
   $enout_1=0$
   $enout_2=0$.

Figure 9:
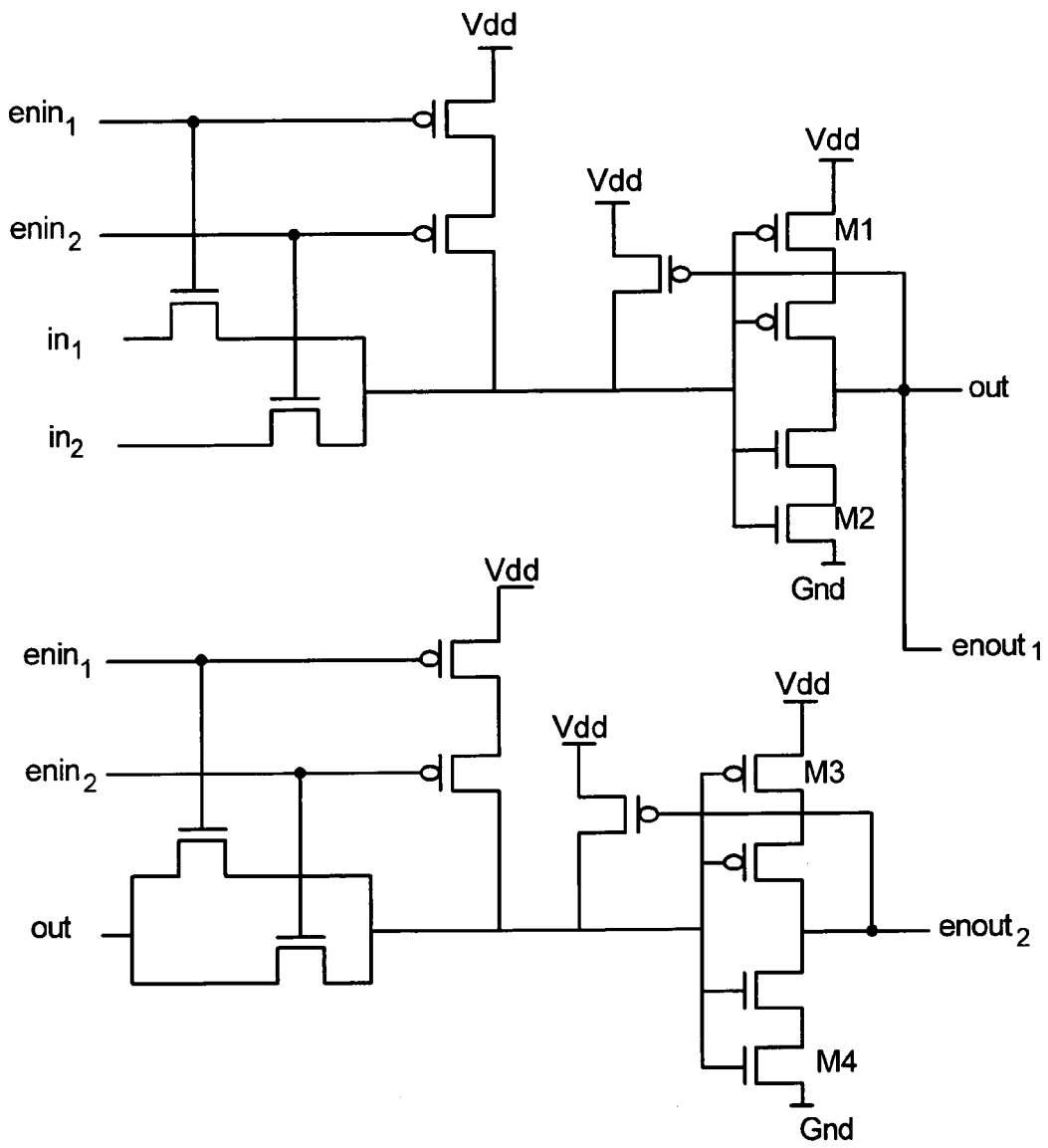
FIG. 9 is a nonlimiting exemplary diagram of the introverted switch of FIG. 7.

FIG. 9 is a nonlimiting exemplary diagram of the introverted switch 80 of FIG. 7. The function $f$ of the switch 80 is the complement function, as one of ordinary skill in the art would know.

One other property of an introverted switch is that its energy consumption due to leakage is also very low. Referring back to FIG. 9, the Vdd and Gnd lines are isolated in terms of subthreshold leakage current paths. One Vdd-Gnd subthreshold leakage path exists due to the inverters producing out and $enout_2$ values, and this path is isolated by the transistors M1, M2, M3 and M4 that help minimize the leakage current. Another way to minimize the leakage energy consumption is by using a high-$V_T$ (high threshold-voltage) transistor type for M1 and M3.

Figure 10:
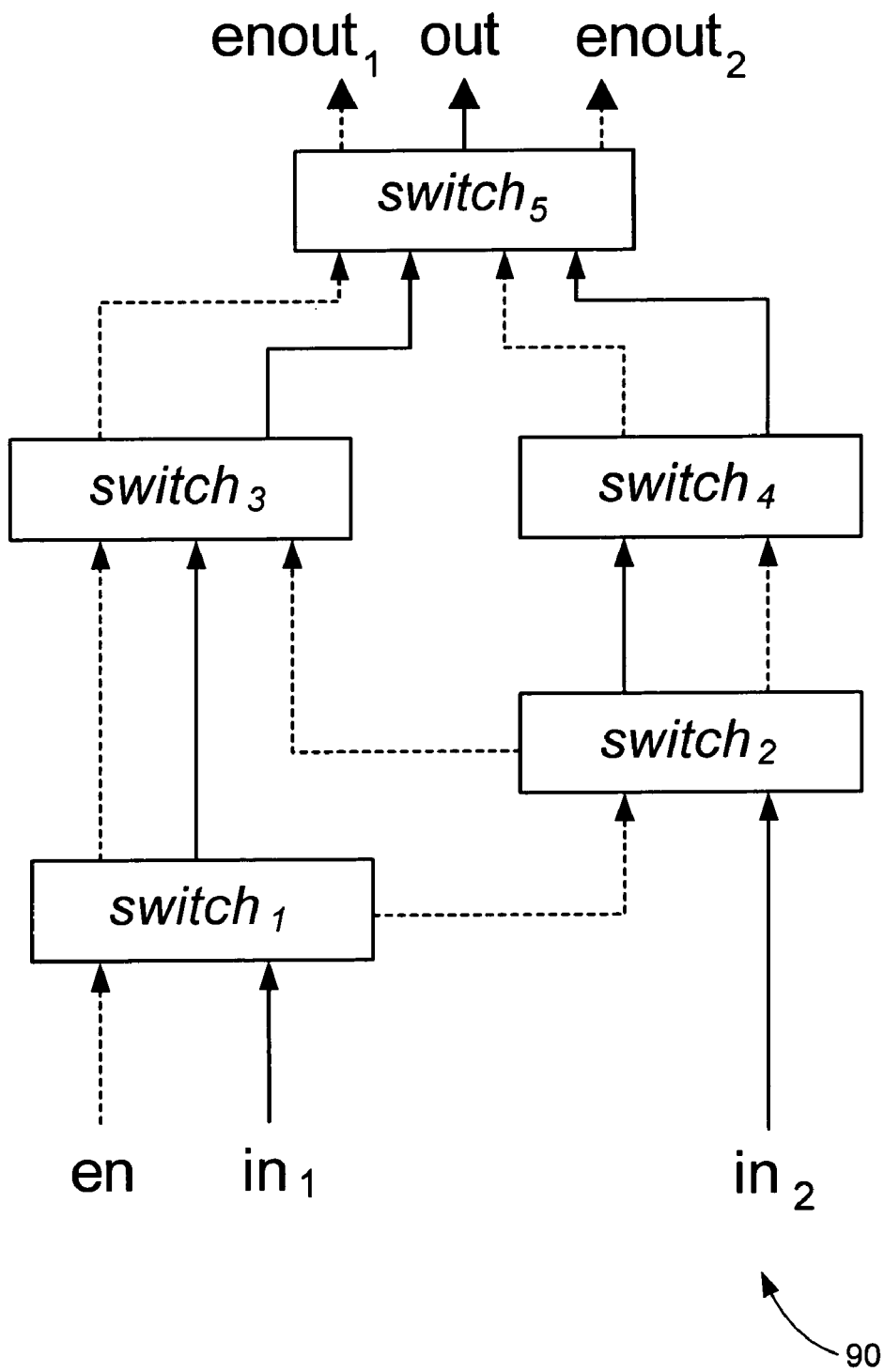
FIG. 10 is a nonlimiting exemplary diagram of a 2-input AND gate circuit implemented using five introverted switches of FIG. 9.

Using introverted switches, logic operations such as AND, NAND, OR, NOR, and many others can be implemented, as one of ordinary skill would know. FIG. 10 is a diagram of a 2-input AND gate circuit 90 implemented using five introverted switches 80 of FIG. 7. In this figure, the function $f$ of the switches switch1, switch2 and switch5 is the identity function, the function $f$ of the switch switch3 is the constant function 0, and the function $f$ of the switch switch4 is the constant function 1.

Figure 11:
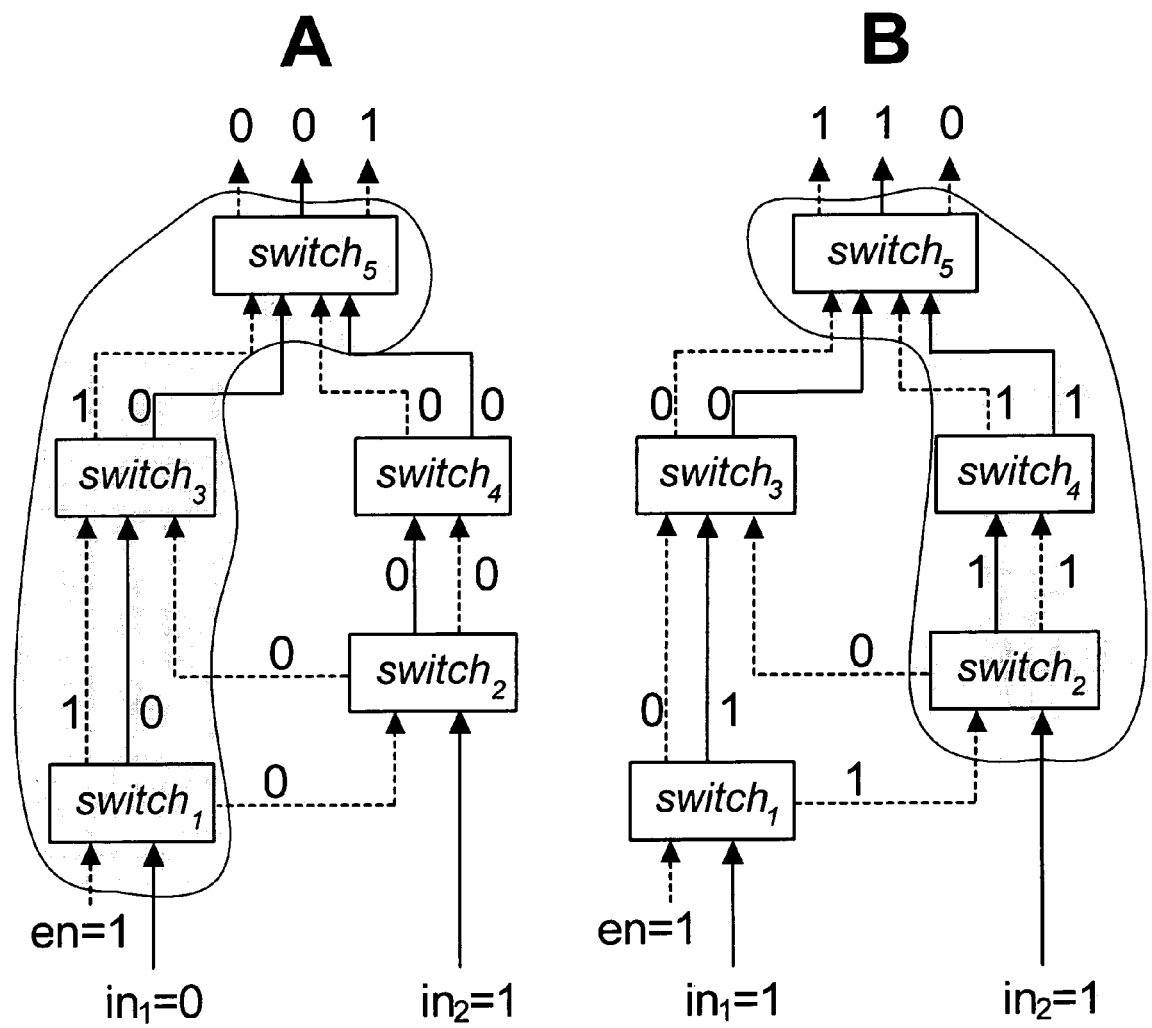
FIG. 11 depicts the values of the input and output signals of all the switches of FIG. 10 when the inputs of the AND gate are $in_1 in_2 = 01$ (in instance A) and $in_1 in_2 = 11$ (in instance B).

This AND gate switch 90 implementation is a naturally energy-aware design, as one of ordinary skill in the art would know. FIG. 11 is a nonlimiting example of two instantiations A and B of the circuit 90 of FIG. 10. Instance A of FIG. 11 depicts the values of the input and output signals of all the switches when the inputs of the AND gate are $in_1 in_2=01$. Instance B depicts the case when the inputs of the AND gate are $in_1 in_2=11$. The shaded regions in these two instances include the switches that are active for the given input. As a nonlimiting example, in instance A, the switches switch1, switch3 and switch5 are active, whereas the switches switch2 and switch4 are idle.

Therefore, for a given input, there exists a unique path that includes active switches. The remaining switches outside this path are idle. This unique path property allows a large portion of the network to be quiescent and enables on-demand energy consumption. This technique is similar to a guarded evaluation technique, as one of skill in the art would know. A guarded evaluation technique is applicable for coarse-grained circuit building blocks. In the introverted-switch-based designs, however, the on-demand energy consumption is at the switch-level granularity, and hence, the energy savings are significant.

It should be emphasized that the above-described embodiments and nonlimiting examples are merely possible examples of implementations, merely set forth for a clear understanding of the principles disclosed herein. Many variations and modifications may be made to the above-described embodiment(s) and nonlimiting examples without departing substantially from the spirit and principles disclosed herein. All such modifications and variations are intended to be included herein within the scope of this disclosure and protected by the following claims.

We claim:

1. A method for conserving an amount of energy consumed by a processor, comprising the steps of:
supplying the processor with a predetermined supply voltage;
detecting a randomized signal, wherein the detected randomized signal is amplified to a predetermined level if the detected randomized signal is below the predetermined level; and
providing an output data bit having a logical value of a 1 or 0 from one or more switches in the processor according to a probability value that the output data bit is correct, the probability value being established in association with the randomized signal and the predetermined supply voltage, wherein an application executed by the processor uses the output data bit for one or more additional computations.

2. The method of claim 1, wherein the predetermined supply voltage is adjustable to a plurality of levels, wherein the probability value of the output data bit being correct increases or decreases in correspondence as the predetermined supply voltage is changed between the plurality of levels.

3. The method of claim 2, wherein the level predetermined supply voltage is configurable by a user of a device utilizing the processor according to an input received from the user.

4. The method of claim 2, wherein the level predetermined supply voltage is selected by an application being executed by the processor so as to increase or decrease the probability of an output data bit being correct according to a predetermined value.

5. The method of claim 1, wherein the randomized signal is amplified to a predetermined level of a plurality of levels, wherein the probability value of the output data bit being correct increases or decreases in correspondence as the amplified level of the randomized signal.

6. The method of claim 5, wherein the amplified level of the randomized signal is configurable by a user of a device utilizing the processor according to an input received from the user.

7. The method of claim 5, wherein the amplified level of the randomized signal is determined according to an application being executed by the processor so as to increase or decrease the probability of correctness of an output data bit utilized during application execution.

8. The method of claim 1, wherein the detected randomized signal corresponds to thermal noise.

9. The method of claim 1, wherein the detected randomized signal corresponds to noise generated by a random signal generator.

10. The method of claim 1, wherein the detected randomized signal corresponds to input/output signaling noise.

11. The method of claim 1, wherein the processor is utilized in a portable electronic device that is battery-powered, wherein the life of the battery is extended when the determined probability is reduced.

12. The method of claim 1, further comprising the steps of:

asserting a first enable input signal coupled to a switch in the processor in association with a first input to the switch, wherein a second enable input signal coupled to the switch in association with a second input to the switch is nonasserted;

asserting the second enable input signal coupled to the switch, wherein the first enable input signal coupled is nonasserted; and providing a primary output signal and first and second enable output signals from the switch in accordance with the first and second enable inputs.

13. The method of claim 12, wherein the first and second enable input signals may be nonasserted as logical zeros so that the switch is deactivated until one of the first and second enable input signals is asserted as a logical one to activate the switch.

14. The method of claim 12, wherein the switch may be utilized as part of a logical AND, NAND, OR, or NOR operation.

15. The method of claim 1, wherein the one or more switches may be individually deactivated according to one or more enable inputs coupled to each switch.

16. A method for conserving an amount of energy consumed by a processor having switches comprised of one or more single electron transistors, comprising the steps of:
supplying a clock signal;
establishing a randomized signal corresponding to a time for an electron to tunnel through one or more single electron transistors;
determining a probability that an output of a switch in the processor is correct in association with the randomized signal and the clock signal; and
providing an output data bit from the switch having a logical value of a 1 or 0 according to the determined probability, wherein an application executed by the processor uses the output data bit for one or more additional computations.

17. The method of claim 16, wherein a duration of the clock signal is extended to increase the determined probability that the output from the switch is accurate and shortened to decrease the determined probability that the output from the switch is accurate.

18. The method of claim 17, wherein the duration of the clock signal is established according to an input received from a user of a device utilizing the processor.

19. The method of claim 17, wherein the duration of the clock signal is established by an application being executed by the processor.

20. The method of claim 16, wherein the processor is utilized in a portable electronic device that is battery-powered, wherein the life of the battery is extended when the determined probability is reduced.

21. A processor having one or more binary switches configured to operate at a predetermined probability that the one or more binary switch outputs is correct, comprising:

a predetermined supply voltage coupled to the one or more binary switches;

a randomized signal detector configured to detect a randomized signal;

an amplifier configured to amplify the randomized signal to a predetermined level if the randomized signal is below the predetermined level; and a computing element configured to output a binary bit having a 0 or a 1 with a predetermined probability value of being correct in correspondence with the predetermined supply voltage, wherein an application executed by the processor receives the output binary bit for one or more additional operations.

22. The processor of claim 21, wherein the predetermined probability value may be increased or decreased in association with an adjustment of a level of amplification by the amplifier.

23. The processor of claim 21, further comprising:
an user-selectable input coupled to the binary switch and configured to increase or decrease the predetermined supply voltage to an adjusted level according to a user selection, the predetermined probability value varying in proportion to the adjustment of the predetermined supply voltage.

24. The processor of claim 21, wherein the processor is a component of a portable electronic device powered by a battery.

25. The processor of claim 24, wherein the battery provides power to the processor for a greater period of time when the predetermined probability level is decreased and provides power to the processor for a shorter period of time when the predetermined probability level is increased.

26. The processor of claim 21, further comprising:
a resistor coupled to a binary switch and configured to produce the randomized signal in correspondence with thermal noise in the processor.

27. The processor of claim 21, wherein the detected signal corresponds to noise in the processor.

28. The processor of claim 21, the one or more binary switches further comprising:
a first and second enable input path, wherein the binary switch is deactivated if the logical value of a signal on both the first and second enable input paths is zero, and wherein the binary switch is activated if the logical value of a signal on either the first and second enable input paths is one.

29. The processor of claim 21, wherein the one or more binary switches may be configured to execute AND, NAND, OR, or NOR logic operations.

30. The processor of claim 21, wherein the one or more binary switches may be individually activated or deactivated so that less than a total number of switches are activated at a given time for execution of an operation.

* * * * *